United States Patent Office 3,544,871
Patented Dec. 1, 1970

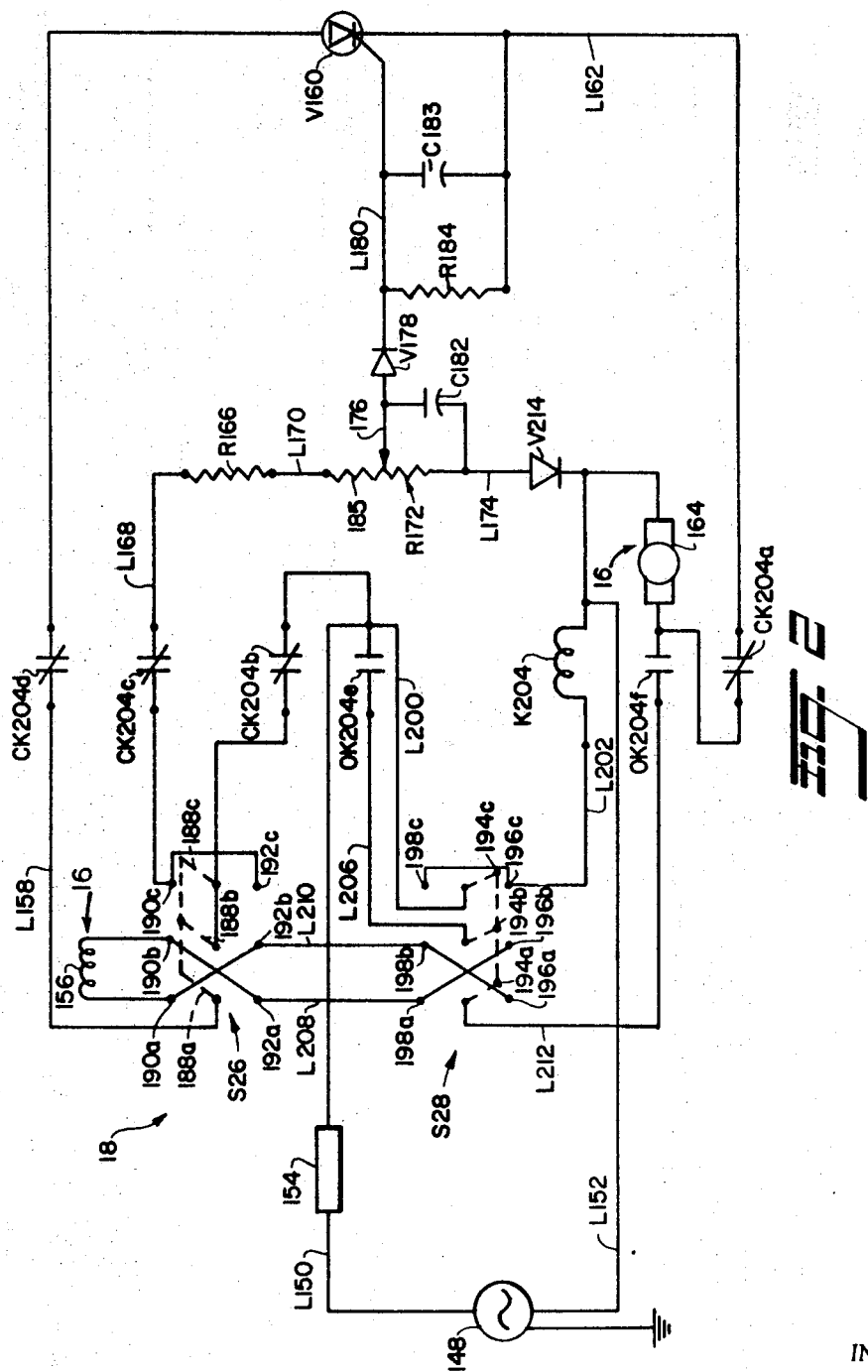

3,544,871
SPEED CONTROL FOR REVERSIBLE MOTOR WITH INDEPENDENTLY OPERATED, REVERSIBLE BYPASS SWITCH
Edward C. Warrick and Edward J. Niehaus, Jr., Pittsburgh, Pa., assignors to Rockwell Manufacturing Company, Pittsburgh, Pa., a corporation of Pennsylvania
Original application Oct. 8, 1965, Ser. No. 494,168. Divided and this application Mar. 21, 1968, Ser. No. 714,905
Int. Cl. H02p 5/16
U.S. Cl. 318—257            10 Claims

ABSTRACT OF THE DISCLOSURE

Power drive units for machine tools and the like including an electric motor, a speed control system capable of maintaining the motor speed at a selectively adjustable level despite changes in the load on the motor and including arrangements for reversing the direction of motor rotation and for bypassing the speed regulating circuitry to operate the motor at a higher speed, and an arrangement including a selectively engageable clutch which can be adjusted to slip at selectively variable torques for drive-connecting the motor to the device with which it is associated.

---

Figure 1:
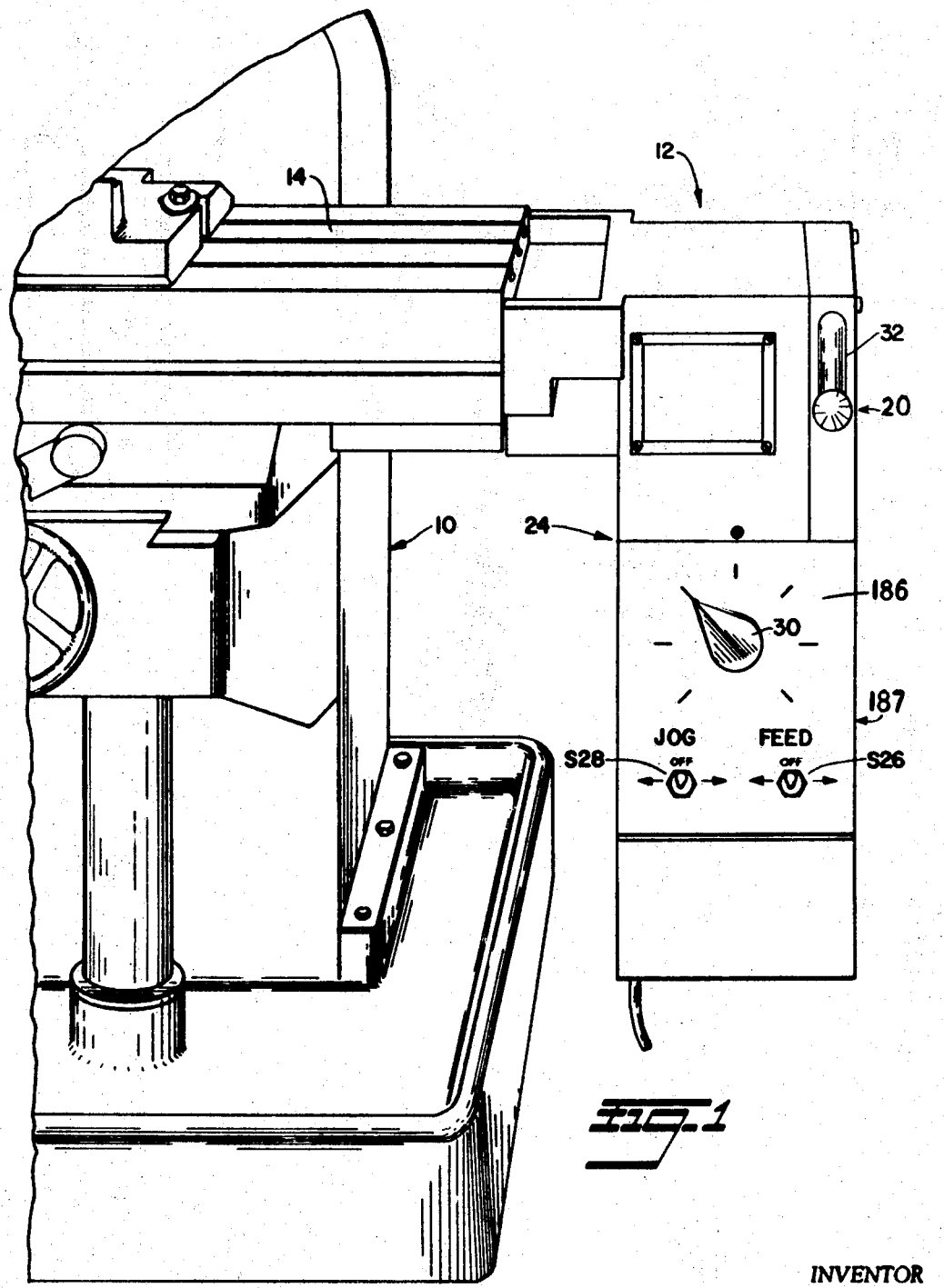

This application is a division of copending parent application No. 494,168 filed Oct. 8, 1965 (now Pat. No. 3,396,826).

This invention relates to power drive units and, more particularly, to self-contained, selectively engageable, variable speed power drive units for machine tools and the like.

The power drive units provided by the present invention may advantageously be employed to operate the table feeds of milling machines, and the principles of the present invention will therefore be developed by relating them to this particular application of the invention. However, as the present invention has other applications, the ensuing discussion is intended to be illustrative and not definitive of the scope of the invention, which is limited only by the appended claims.

Most, if not all, of the smaller milling machines currently on the market have table feeds which must be operated manually despite the recognized advantages of power feeds. This is because the power feeds heretofore available have been too complex and, therefore, too expensive to manufacture and maintain to make them economically feasible for other than high capacity machines.

Accordingly, it is a primary object of the present invention to provide novel power drive units for milling machine table feeds and other applications which are comparatively simple and inexpensive to manufacture and maintain.

Another important and related object of this invention is the provision of novel improved power drive units which can be readily added as accessories to machines having manual feeds.

Generally speaking, the power drives by which these and other objects of the present invention are accomplished are a unitized attachment including an electric motor, a novel electric control for maintaining the motor at an adjustable operating speed, and a transmission for connecting the motor to, for example, the lead screw of a milling machine table feed. The transmission includes a clutch which permits the lead screw to be engaged and disengaged and also prevents the motor from stalling and overheating when the table reaches the limits of its travel.

The speed control system just mentioned is an important feature of the present invention. Basically, this system employs electronic speed regulating circuitry similar to that disclosed in the General Electric SCR Manual (3rd edition). In addition, however, the novel motor control system of the present invention includes circuitry which permits the motor to be selectively operated at speeds above those for which the speed regulating circuitry is set, providing a rapid traverse for a milling machine table, for example. Also, the control circuitry disclosed herein permits the direction of rotation of the drive unit motor to be reversed both at normal operating and rapid traverse speeds by merely throwing a switch.

From the foregoing, it will be apparent that further important but more specific objects of the present invention include novel power drive units which:

(1) include a novel electronic motor control system which is simple and reliable but which provides versatility of operation;

(2) in conjunction with the preceding object, include control systems which provide adjustable drive speeds, rapid traverse speeds which are faster than normal operating speeds, and ready reversal of the direction of motor operation; and (3) in conjunction with the preceding object, have a control system providing rapid traverse which can be activated even though the switch energizing the normal speed regulating circuitry is turned off.

Other objects, additional advantages, and further important features of the present invention will become more fully apparent from the appended claims and as the ensuing detailed description and discussion proceeds in conjunction with the accompanying drawing, in which:

FIG. 1 is a perspective view of a power drive unit constructed in accord with the principles of the present invention and a portion of a milling machine to which the unit is attached to operate the table feed of the milling machine; and FIG. 2 is a circuit diagram of a novel electronic motor control system employed in the power drive unit of FIG. 1.

Referring now to the drawing, FIG. 1 illustrates a milling machine 10 provided with a power drive unit 12 constructed in accord with the principles of the present invention to feed or traverse the table 14 of the milling machine. The major components of drive unit 12 are a universal type electric motor 16, and electronic control system 18 for the motor, and a transmission or drive train 20, which drive connects motor 16 to the lead screw of the milling machine table feed (not illustrated). The foregoing components are encased in or attached to a housing 24 on which feed and rapid traverse switches S26 and S28, a motor speed regulating knob 30, and a clutch operating lever 32 incorporated in transmission 20 are mounted.

The details of the milling machine and its table feed are not part of the present invention; and it is therefore not considered necessary to illustrate or describe the milling machine or table feed in detail herein. Briefly speaking, however, the workpiece to be machined is fixed to table 14 and the table is fed or traversed to the left (or right) as oriented in FIG. 1 to move the work against a rotating tool. This is done by rotating the lead screw mentioned previously, which is axially fixed relative to the table 14 of the machine and passes through a fitting fixed to the frame of the machine and provided with complementary internal threads. Consequently, as the lead screw is rotated, the table moves along it to the left or right as viewed in FIG. 1, depending upon the direction of rotation of the lead screw.

The transmission 20 referred to above is provided to selectively drive-connect motor 16 to and disengage it from the table feed drive screw and to prevent the motor from stalling and overheating when table 14 reaches its limits of travel, as mentioned previously. It is considered unnecessary to describe this transmission in detail herein since it is so disclosed in parent application No. 494,168, which is hereby incorporated by reference.

In addition to the transmission just described, the present invention includes a novel control system 18 for motor 16 (mentioned previously) which permits the motor to be operated at varying speeds to vary the rate of traverse of milling machine table 14 and which permits the direction of rotation of motor 16 to be reversed so that the table may be traversed to either the left or the right as viewed in FIG. 1. In addition, this system includes a novel rapid traverse switch arrangement which permits the normal speed regulating circuitry to be bypassed, permitting the table to be rapidly traversed from one point to another, when desired. The rapid traverse switch circuitry also includes circuitry for reversing the direction of motor rotation so that rapid traverse may be made in either direction.

The motor control system thus briefly described is shown in FIG. 2. Referring now to this figure, motor 16, which will normally be of fractional horsepower and of the reversible, universal type, is connected to an appropriate source of A.C. voltage 148 by leads L150 and L152. Lead L150 is connected from source 148 through a fuse 154 to the field winding 156 of the motor. The field winding is connected through lead L158 to the anode of a silicon controlled rectifier V160 (hereinafter SCR). The cathode of the SCR is connected by lead L162 to the armature winding 164 of motor 16. The latter is connected by lead L152 to the opposite side of power source 148.

From the foregoing it will be apparent that, when SCR 160 is fired, the field and armature windings 156 and 164 of motor 16 will be connected in series across the source of operating voltage 148. The operation of SCR 160 is controlled by circuits including a charging circuit which includes a fixed resistor R166 connected through a branch lead L168 to main lead L150 and through a branch lead L170 to one end of a potentiometer R172. The opposite end of the potentiometer is connected through branch lead L174 and main lead L152 to the opposite side of the voltage source. The slider 176 of potentiometer R172 is connected through diode V178 and branch lead L180 to the gate terminal of SCR V160. Connected across slider 176 and lead L174 is a supply voltage capacitor C182.

The operation of the motor speed regulating circuitry just described is explained in detail in paragraph 8.8.3.2 of General Electric's SCR Manual (3rd edition) so it is not believed necessary to describe its operation in detail herein. Briefly speaking, however, capacitor C182 is charged during the positive half-cycle of the voltage supply from A.C. source 148. When the polarity of the supply voltage reverses, capacitor C182 discharges through potentiometer R172, applying a voltage through slider 176 and lead L180 to the gate of SCR V160 to fire the SCR. This completes the anode-cathode circuit of the SCR, and operating voltage is applied across the armature and field windings 156 and 164 of motor 16. When the polarity of the supply voltage again reverses, the SCR is extinguished; and the process repeats.

When motor 16 is first started up, there is no voltage opposing the gate voltage supplied by capacitor C182; and SCR V160 is therefore turned on early in the cycle. As the speed of the motor increases, a residual voltage builds up in armature winding 164. This is applied through lead L162 to the cathode-gate circuit of SCR V160. The induced voltage opposes the gate voltage; and, therefore, as the motor speed increases, the SCR is fired later in the cycle. Once the motor reaches operating speed, it is automatically maintained at this speed since, if the motor slows down, the residual voltage will decrease; and the SCR will fire earlier in the cycle to increase the motor speed. Conversely, if the load on the motor is decreased, the motor will tend to speed up and the residual voltage will increase, causing the SCR to fire later in the cycle to decrease the motor speed. A capacitor C183 and resistor R184 connected in parallel across leads L162 and L180 prevent spurious signals from firing the SCR.

The speed at which the motor is maintained may be adjusted by moving the slider 176 of potentiometer R172 along the resistance 185 of the latter. This changes the charging rate of the capacitor (which is charged through potentiometer R172) and, therefore, the maximum voltage of the charge stored in the capacitor. Consequently, if potentiometer R172 is set to provide a high resistance, the necessary gate voltage will build up in capacitor C182 later in the cycle, the SCR will be fired later in the cycle, and the motor speed will be lower than if potentiometer R172 is adjusted to provide a lower resistance to fire the SCR earlier in the cycle. In the present invention, the slider 176 of potentiometer R172 is connected to the speed regulating knob 30 (see FIG. 2) on the front panel 186 of a casing 187 which houses the control system 18 and forms the lower part of drive unit housing 24.

In addition to the circuitry just described, motor control 18 includes the feed switch S26, mentioned previously, which is of the double throw, triple pole type. Switch S26 may be thrown so that contactors 188a–c engage either switch contacts 190a–c or contacts 192a–c. With the switch thrown to the first of these positions, current will flow in a direction through field windings 156 which is opposite to the direction of current flow when the switch is in the second of these positions. Consequently, by throwing switch S26 to one or the other of these two positions, the direction of current flow through the motor field windings and, therefore, the direction of rotation of motor 16, can be reversed. This arrangement is an important feature of the present invention since it provides an extremely simple and reliable means of reversing the direction of traverse of milling machine table 14.

Another important feature of control system 18 is the previously mentioned rapid traverse switch S28, which is also a double throw, triple pole switch, except that switch S28 is of the momentary type. In other words the contactors 194a–c of switch S28 must be held against switch contacts 196a–c or 198a–c. If the switch actuator is released, the switch will open as shown in FIG. 2. Rapid traverse switch S28 may be employed to effect rapid traverse of milling machine table 14. It is accordingly an important feature of the present invention because it permits the milling machine table to be moved quickly from one point to another under circumstances where it is not necessary to traverse the table at the slower feed speeds employed when the workpiece is being moved against the cutting tool.

Referring now to FIG. 2, with contactors 194 a–c of rapid traverse switch S28 held against switch contacts 196a–c, a circuit is completed from voltage source 148 through main lead L150, branch lead L200, contactor 194c, switch contact 196c, and branch lead L202 to one end of the coil of a relay K204, the opposite end of which is connected by main lead L152 to the power source. Energization of relay K204 opens its normally closed contacts CK204a–d and closes its normally open contacts OK204e and OK204f.

Opening of the normally closed contacts OK204a–d interrupts the continuity of leads L150, L158, L162, and L168. The discontinuity in lead L150 interrupts the circuit from voltage source 148 to feed switch S26, and the discontinuity in lead L168 interrupts the charging circuit for the supply voltage capacitor C182.

The interruption of the continuity in leads L158 and L162 interrupts the voltage supply circuit through the SCR to the field and armature windings 156 and 164 of motor 16. However, with normally open contacts OK204e and OK204f closed, field and armature windings 156 and 164 are connected directly across voltage source 148 by a circuit including main lead L150, branch lead L206, rapid traverse switch contactor 194b, rapid traverse switch contact 196b, branch lead L208, field winding 156, branch lead L210, rapid traverse switch contact 196a, rapid traverse switch contactor 194a, branch lead L212, armature winding 164, and main lead L152 (a diode V214 in lead L174 prevents the voltage across this circuit from being applied across the supply capacitor charging circuit to trigger the SCR). This circuit applies maximum voltage across the field and armature windings, operating motor 16 at its highest speed to cause rapid traverse of milling machine table 14.

When the actuator of rapid traverse switch S28 is released, the switch automatically opens as described previously; and relay K204 de-energizes, restoring control of the motor speed to SCR V160 through the circuitry described previously.

When rapid traverse switch S28 is thrown so that contactors 194a-c engage contacts 198a-c rather than contacts 196a-c, field and armature windings 156 and 164 are connected directly across voltage source 148 in the manner just described except that the current flows in the opposite direction through the field windings. Motor 16 therefore rotates in the opposite direction to traverse table 14 in the opposite direction.

From the foregoing, it will be apparent that the rapid traverse switch circuitry just described is an important feature of the present invention since it not only provides for rapid traverse of table 14 in both directions but, in addition, provides the rapid traverse function without disturbing the normal operating speed to which motor 16 is adjusted by manipulation of speed control knob 30.

From the foregoing description of an exemplary application of the principles of the present invention, it will be apparent to those skilled in the arts to which the present invention relates that the principles of this invention are by no means limited to this one particular application of them. Therefore, as mentioned previously, the foregoing description of one particular application of these principles is intended to be merely illustrative and not limiting. Also, it will be apparent to those having the appropriate skills that the illustrated embodiment of the present invention is not limited to use with one particular type of milling machine but that it can be adapted to any milling machine having a manual table feed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A variable speed power drive unit for power tools and like devices, comprising an electric motor; a control system including electronic speed regulating means for maintaining said motor at a preselected operating speed; a selectively actuable rapid traverse switch having an inoperative position in which said electronic speed regulating means maintains said motor at said preselected operating speed and two operative positions; a first circuit means activatable by the movement of said switch to one of said operative positions for connecting said motor in one sense directly across a source of A.C. operating voltage to increase the power supplied to said motor and thereby increase the speed of said motor above said preselected operating speed in one direction; and a second circuit means activatable by the movement of said switch means to the other of said operative positions for connecting said motor in the opposite sense directly across said voltage source to thereby effect operation of said motor at the increased speed in the opposite direction, whereby increased speed operation of said motor in opposite directions can be effected by movement of the rapid traverse switch to one or the other of its said two operative positions.

2. The unit of claim 1, wherein said rapid traverse switch has contacts biased to said inoperative position, whereby said motor will automatically revert to control by the electronic speed regulating means upon release of the force maintaining the rapid traverse switch in an operative position.

3. The variable speed power drive unit of claim 1, together with means including a selectively operable switch operatively connected to said motor for reversing the direction of rotation of the motor, said selectively operable switch being mechanically and operably independent of said rapid traverse switch, whereby reversal of the direction of motor operation may be accomplished independently of the rapid traverse function.

4. The drive unit of claim 1, together with a control member which is adjustable to alter the operating speed of the motor, and wherein said rapid traverse switch is mechanically independent of and actuatable without disturbing the adjustment of said control member, whereby the connection of said motor across the A.C. source in either sense may be made and broken without disturbing the normal operating speed setting of the motor.

5. The drive unit of claim 1, wherein said electric motor has an armature winding and a field winding and including: means for connecting said armature winding across said source of A.C. operating voltage; said first circuit means being activatable by the movement of said traverse switch to one of said operative positions for connecting the field winding of said motor in one sense directly across said source of A.C. operating voltage to increase the power supplied to said motor and thereby increase the speed of said motor above said preselected operating speed in one direction; and said second circuit means being activatable by the movement of said traverse switch means to the other of its operative positions for connecting the field winding of said motor in the opposite sense directly across said voltage source without changing the sense in which the armature winding is connected across the source of operating voltage to effect operation of said motor at the increased speed in the opposite direction, whereby increased speed operation of said motor in either of two opposite directions can be effected by movement of the rapid traverse switch to one or the other of its said two operative positions.

6. The variable speed power drive unit of claim 1, wherein the electric motor has series connected armature and field windings adapted to be connected across the source of A.C. operating voltage and wherein the means for maintaining said motor at a preselected operating speed includes an electronic switch having first and second terminals connected in series with said motor windings and a third terminal, the application of a control voltage of predetermined magnitude to which will turn on said switch and complete a conductive path between said first and second terminals; circuit means for turning said switch on and off at a frequency and for periods of a duration determined by the variation of the speed of the motor from a predetermined operating speed including a capacitor connected to the control terminal of the electronic switch, a charging circuit through which said capacitor is alternately charged to a voltage at least equal to the control voltage and discharged to periodically turn said switch on and off; and including an override circuit in parallel with said electronic switch for connecting the armature winding directly to the field winding; a relay having normally closed contacts in series with said motor windings and said electronic switch and normally open contacts in said override circuit; and means including said selectively operable rapid traverse switch for energizing said relay to open its normally closed contacts, thereby interrupting the connections between the electronic switch and the motor windings and closing its normally open contacts to complete said override circuit, whereby the motor windings are connected directly across the source of operating voltage to increase the speed of said motor above the operating speed maintained by the turning on and off of said electronic switch.

7. The drive unit of claim 6, wherein said relay has a normally closed contact in the capacitor charging circuit.

8. The variable speed power drive unit of claim 6, together with a variable resistance means in the circuit through which said capacitor is charged for varying the charging rate of said capacitor and accordingly changing the predetermined operating speed of the motor and a control member for varying the resistance of said resistance means; wherein said rapid traverse switch is mechanically independent of and actuatable without disturbing the adjustment of the control member, whereby the selective operation of the motor at increased speed may be effected without disturbing the adjustment of the control member and, accordingly, without alteration of the predetermined operating speed setting; and including means comprising a selectively operable switch operatively connected to said motor windings for reversing the direction of rotation of the motor, said selectively operable switch being mechanically and operably independent of said control member, whereby reversal of the direction of motor operation may be accomplished without alteration of the predetermined operating speed of the motor selected by the adjustment of the control member.

9. The variable speed power drive unit of claim 1 wherein the electric motor has series connected armature and field windings adapted to be connected across the source of A.C. operating voltage and wherein the means for maintaining the motor at a preselected operating speed includes an electronic switch having first and second terminals connected in series with said motor windings and a third terminal, the application of a control voltage of predetermined magnitude to which will turn on said switch and complete a conductive path between said first and second terminals; circuit means for turning said switch on and off at a frequency and for periods of a duration determined by the variation of the speed of the motor from a predetermined operating speed including a capacitor connected to the control terminal of the electronic switch and a charging circuit through which said capacitor is alternately charged to a voltage at least equal to the control voltage and discharged to periodically turn said switch on and off; an override circuit in parallel with said electronic switch for connecting the armature winding directly to the field winding; means including said selectively operable rapid traverse switch for interrupting the connections between the electronic switch and the motor windings and completing said override circuit, whereby the motor windings are connected directly across the source of operating voltage to increase the speed of said motor above the operating speed maintained by the turning on and off of said electronic switch; and means for preventing said capacitor from being charged through the override circuit when the rapid traverse switch is closed comprising a junction between the capacitor charging circuit and the override circuit and a diode in the charging circuit.

10. A speed control for an electric motor having series connected armature and field windings adapted to be connected across a source of A.C. operating voltage, comprising an electronic switch having first and second terminals connected in series with said motor windings and a third terminal, the application of a control voltage of predetermined magnitude to which will turn on said switch and complete a conductive path between said first and second terminals; circuit means for turning said switch on and off at a frequency and for periods of a duration determined by the variation of the speed of the motor from a predetermined operating speed including a capacitor connected to the control terminal of the electronic switch, a charging circuit through which said capacitor is alternately charged to a voltage at least equal to the control voltage and discharged to periodically turn said switch on and off, and a variable resistance means in the circuit through which said capacitor is charged for varying the charging rate of said capacitor and accordingly changing the predetermined operating speed of the motor; a control member for varying the resistance of said resistance means; an override circuit in parallel with said electronic switch for connecting the armature winding directly to the field winding; a relay having normally closed contacts in series with said motor windings and said electronic switch and normally open contacts in said override circuit; means including a selectively operative rapid traverse switch for energizing said relay to open its normally closed contacts, thereby interrupting the connections between the electronic switch and the motor windings and closing its normally open contacts to complete said override circuit, whereby the motor windings are connected directly across the source of operating voltage to increase the speed of said motor above the operating speed maintained by the turning on and off of said electronic switch, said rapid traverse switch being mechanically independent of and actuatable without disturbing the adjustment of the control member, whereby the override circuit can be completed and broken without disturbing the adjustment of the control member, and, accordingly, without alteration of the predetermined operating speed setting; and means for preventing said capacitor from being charged through the override circuit when the rapid traverse switch is closed comprising a junction between the capacitor charging circuit and the override circuit and a diode in the charging circuit.

References Cited

UNITED STATES PATENTS

| | | | |
|---|---|---|---|
| 2,595,749 | 5/1952 | Arndt | 318—300 |
| 2,947,833 | 8/1960 | Greenhut | 318—300 |
| 3,222,583 | 12/1965 | Gutzwiller | 318—331 |
| 3,303,403 | 2/1967 | Bonanno | 318—257 |
| 3,237,076 | 2/1966 | Kimbleton | 318—341 |
| 3,249,839 | 5/1966 | Fay | 318—331 |
| 3,278,821 | 10/1966 | Gutzwiller | 318—331 |

ORIS L. RADER, Primary Examiner

THOMAS LANGER, Assistant Examiner

U.S. Cl. X.R.

318—331